Figure 1:
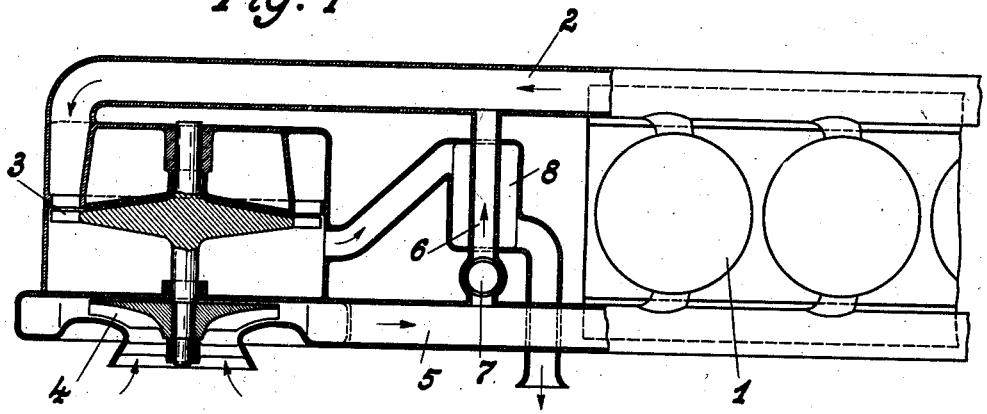

Sept. 12, 1939.　　　　　　E. SCHMITT　　　　　　2,172,809
METHOD OF CONTROLLING THE SUPERCHARGING PRESSURE
IN INTERNAL COMBUSTION ENGINES
Filed Aug. 20, 1936

Inventor:
Erich Schmitt
By [signature]
Atty.

Patented Sept. 12, 1939

2,172,809

UNITED STATES PATENT OFFICE 2,172,809

METHOD OF CONTROLLING THE SUPERCHARGING PRESSURE IN INTERNAL COMBUSTION ENGINES

Erich Schmitt, Mannheim, Germany, assignor to Maschinenfabrik Augsburg-Nurnberg, A. G., Augsburg, Germany, a corporation of Germany Application August 20, 1936, Serial No. 96,962
In Germany August 20, 1935

6 Claims. (Cl. 60—13)

My invention relates to internal combustion engines.

In internal combustion engines which are equipped with a supercharging system, comprising a turbo-blower and an exhaust turbine operating the same (with or without an auxiliary drive) it is a desideratum to be able to control the supercharging pressure so as to adapt in case of variable loads of the combustion engine the air-weight supplied to the working cylinders to the amount of fuel fed to the cylinders, that is to say, to supply by means of a higher supercharging pressure a correspondingly greater air-weight upon an increasing load and an increasing amount of fuel, and vice-versa, to reduce upon a decreasing load the air-weight supplied by a corresponding decrease of the supercharging pressure.

To increase the output of the turbine operating the blower and thereby the supercharging pressure by a reduction of the cross-section of the nozzle of the exhaust gas turbine is old. However, because of the high temperatures of the exhaust gases flowing to the exhaust turbine, nozzle valves for controlling the cross-sections of the nozzles of the exhaust gas turbine present great difficulties both from the standpoints of design and operation.

The present invention, therefore, provides for constant cross-sections of the nozzles, and in accordance with the invention a portion of the air under pressure supplied by the turbo-blower is directly conducted into the exhaust gas conduits between the combustion engine and the exhaust gas turbine. Furthermore, according to the present invention, the amount of the control-air is increased by a valve in the control-air conduit being more or less opened, if the supercharge pressure shall be increased, while the amount of the control-air is decreased, if the supercharge pressure shall be reduced. If one permits increasing gas-weights to flow through a given cross-section of the nozzles of the exhaust gas turbine, increasing temperature drops are required, if the temperature in front of the nozzles is not to be too sharply reduced with the increasing gas-weight. Because of the increase in the temperature drop, the energy supplied to the turbine increases much more than corresponds to the increase of the gas-weight flowing through the nozzles. There is, therefore, a relay effect of the control air flowing to the turbine.

This relay effect is the stronger, the less the temperature of the gas in front of the nozzles decreases with increasing gas-weight. As a further development of the inventive idea, therefore, the amount of the control-air between the blower and the exhaust gas turbine shall be heated, for the purpose of maintaining the mixing temperature in front of the nozzles as high as possible. If for the heating of the control-air the waste heat of the exhaust gas turbine is used, the control-air, in view of the small temperature drop arising in the exhaust gas turbine, can be heated to close the temperature of the gases flowing into the turbine. Consequently, the mixing temperature for control-air and exhaust gas of the internal combustion engine will decrease only slightly with increasing control-air, and the energy supplied to the turbine can be increased to the highest values possible. To an increasing turbine output corresponds an increasing supercharge pressure at the blower, resulting in the desired object being obtained.

The control-air, for the purpose of being heated, can be passed through a closed heat insulating jacket enclosing the turbine and the hot gas-conducting conduits, whereby a partial substitute at least is obtained for the effect of heat insulation, or water-cooling of the hot parts.

The regulating valve in the control-air conduit can be so adjusted that upon an increase in the fuel supply also the supercharging pressure increases. Since in the operation of air-craft the outside air-pressure at higher altitudes decreases, it is desirable, if also at higher altitudes the supercharging pressure, notwithstanding the smaller outside air pressure, can be maintained at the same height as on the ground so that the output of the combustion engine is not reduced at higher altitudes because of reduced weight of the air in the working cylinders.

Figure 2:
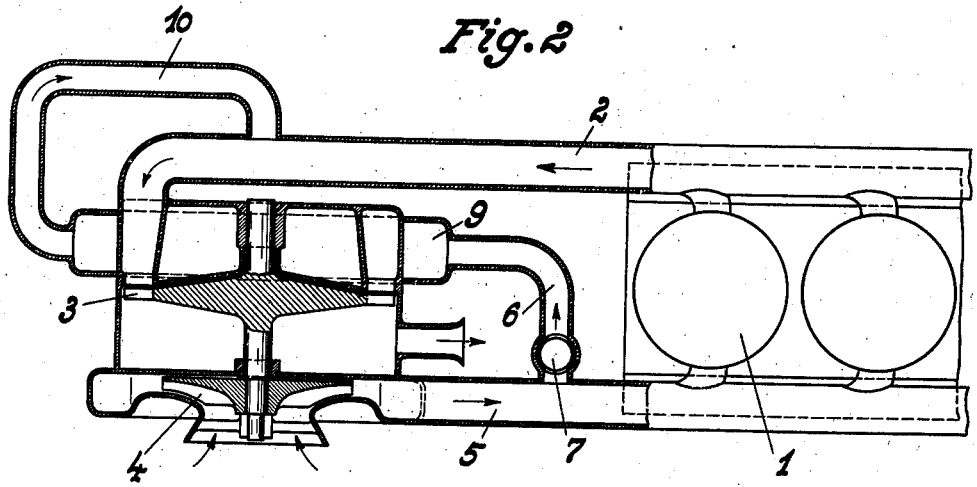

In the annexed drawing, in which, by way of illustration, I have diagrammatically shown two embodiments of this invention, Fig. 1 is a top plan view of one of the embodiments, while Fig. 2 is a similar view of a modified embodiment.

In the drawing, the combustion engine is indicated at 1, while at 3 is indicated the exhaust gas turbine to which the hot exhaust gases from the combustion engine are conducted through a conduit shown at 2. At 4 is indicated a blower which is operated by the turbine 3. At 5 is shown a conduit for conducting air under pressure to the combustion engine 1.

As shown in Fig. 1, the conduits 2 and 5 are connected by a transverse conduit 6 in which is provided at 7 a valve, whereby the flow of air under pressure into the exhaust gas conduit 2 can be controlled. The valve 7 is adjusted by hand, but may also, if desired, be automatically positioned. For heating the air under pressure flowing to the exhaust-gas conduit 2, a heating jacket surrounding the transverse connecting conduit 6 is provided.

As will be seen in Fig. 2, the transverse conduit 6 does not lead directly to the exhaust gas conduit 2, but terminates in a cooling jacket 9 surrounding the turbine 3, and the air under pressure after having absorbed heat in said cooling jacket flows through the conduit shown at 10 to exhaust gas conduit 2. The advantage of this arrangement is that simultaneously with the heating of the air under pressure the exhaust-gas turbine is cooled.

I claim:

1. The method of controlling the supercharging pressure in internal combustion engines, wherein an exhaust-gas-operated turbine operates a blower for supplying air to the engine, which comprises delivering to the turbine as control air for the same a controlled portion of the air under pressure delivered by the blower, and heating said portion of the air during its flow from the blower to the turbine.

2. The method of controlling the supercharging pressure in internal combustion engines wherein an exhaust-gas-operated turbine operates a blower for supplying air to the engine, which comprises delivering to the turbine as control air for the same a controlled portion of the air under pressure delivered by the blower, and heating said portion of the air during its flow from the blower to the turbine by transferring thereto waste heat from the exhaust gases utilized for operating the turbine.

3. In an internal combustion engine to be operated with supercharging pressure, a turbine, a conduit for conducting exhaust gases from the engine to said turbine for operating the latter, a blower connected with said turbine to be driven thereby, a conduit for conducting supercharging air from said blower to the engine, a conduit for conducting control air from said blower to said turbine, means for regulating flow of air through said last-mentioned conduit, and means for utilizing exhaust gas waste heat for heating turbine control air flowing from the blower to the turbine through said last mentioned conduit.

4. In an internal combustion engine to be operated with supercharging pressure, a turbine, a conduit for conducting exhaust gases from the engine to said turbine for operating the latter, a blower connected with said turbine to be driven thereby, a conduit for conducting supercharging air from said blower to the engine, a conduit for conducting control air from said blower to said turbine, means for regulating flow of air through said last mentioned conduit, and means for transferring, to control air flowing through said last mentioned conduit, heat from the exhaust gases after passage of the same through the turbine.

5. In an internal combustion engine to be operated with supercharging pressure, a turbine, a conduit for conducting exhaust gases from the engine to said turbine for operating the latter, a blower connected with said turbine to be driven thereby, a conduit for conducting supercharging air from said blower to the engine, a conduit for conducting control air from said blower to said turbine, means for regulating flow of air through said last mentioned conduit, and means for transferring, to control air flowing through said last mentioned conduit, heat from the exhaust gases during passage of the same through the turbine.

6. In an internal combustion engine operated with supercharging pressure, the combination with the engine cylinders, of an exhaust gas turbine, a turbo-blower driven thereby, a conduit for conducting the exhaust gases from said engine cylinders to said turbine, a conduit for conducting the air under pressure produced by said turbo-blower to said engine cylinders, a transverse conduit connecting said last named conduit with said exhaust gas conduit for conducting air under pressure to said exhaust gas turbine thereby increasing the pressure of the air and gas mixture supplied to said turbine so as to in turn increase the output of said blower, means for heating the air under pressure while flowing through said transverse conduit, and a means for controlling the amount of air under pressure flowing through said transverse conduit into said exhaust gas conduit.

ERICH SCHMITT.